(12) United States Patent
Zmudzinski et al.

(10) Patent No.: US 7,269,629 B2
(45) Date of Patent: Sep. 11, 2007

(54) METHOD AND APPARATUS FOR DISTRIBUTING NOTIFICATION AMONG COOPERATING DEVICES AND DEVICE CHANNELS

(75) Inventors: Krystof C. Zmudzinski, Forest Grove, OR (US); Rob C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 10/335,100

(22) Filed: Dec. 30, 2002

(65) Prior Publication Data

US 2004/0128310 A1    Jul. 1, 2004

(51) Int. Cl.
*G06F 15/16* (2006.01)

(52) U.S. Cl. .................. 709/207; 709/206; 709/217; 709/219

(58) Field of Classification Search ........... 709/217, 709/218, 219, 206, 207
See application file for complete search history.

(56) References Cited

U.S. PATENT DOCUMENTS

| | | | | |
|---|---|---|---|---|
| 5,068,880 A * | 11/1991 | Kline et al. | ........... | 375/368 |
| 5,949,326 A * | 9/1999 | Wicks et al. | ........... | 340/7.29 |
| 6,301,609 B1 * | 10/2001 | Aravamudan et al. | ...... | 709/207 |
| 6,510,524 B1 * | 1/2003 | Osborn et al. | ........... | 713/323 |
| 6,523,073 B1 * | 2/2003 | Kammer et al. | ........... | 710/48 |
| 6,658,576 B1 * | 12/2003 | Lee | ........... | 713/320 |
| 6,668,167 B2 * | 12/2003 | McDowell et al. | ........... | 455/433 |
| 6,683,871 B1 * | 1/2004 | Lee et al. | ........... | 370/356 |
| 6,763,004 B1 * | 7/2004 | De Oliveira | ........... | 370/312 |
| 6,763,384 B1 * | 7/2004 | Gupta et al. | ........... | 709/224 |
| 6,782,062 B1 * | 8/2004 | Wieck | ........... | 375/345 |
| 6,831,921 B2 * | 12/2004 | Higgins | ........... | 370/401 |
| 6,874,017 B1 * | 3/2005 | Inoue et al. | ........... | 709/217 |
| 6,937,588 B2 * | 8/2005 | Park | ........... | 370/338 |
| 6,938,076 B2 * | 8/2005 | Meyer et al. | ........... | 709/219 |
| 6,973,306 B2 * | 12/2005 | Kim | ........... | 455/426.1 |
| 7,032,029 B1 * | 4/2006 | Tanzman et al. | ........... | 709/245 |
| 7,110,783 B2 * | 9/2006 | Bahl et al. | ........... | 455/516 |
| 7,171,473 B1 * | 1/2007 | Eftis et al. | ........... | 709/227 |

(Continued)

OTHER PUBLICATIONS

Sierra Wireless CDPD Primer; 2130006 Rev 1.0; Apr. 2001 (35 pages).

(Continued)

*Primary Examiner*—Zarni Maung
*Assistant Examiner*—Sargon N Nano
(74) *Attorney, Agent, or Firm*—Marger Johnson & McCollom, PC

(57) ABSTRACT

Methods and devices for networked applications are disclosed. In one embodiment, a device instructs a proxy server to receive traffic inbound for the device, and to notify the device when such traffic arrives. The device can then sleep, except for a notification channel that listens for a wakeup message from the proxy server. The proxy server detects traffic inbound for proxied devices, caches the data from that traffic, and issues notification messages to the proxied devices to cause those devices to download the cached data. One use for such a system is in instant messaging, as it allows a subscriber to place a battery-powered computing device in sleep mode while still advertising a continuous presence to her messaging buddies.

19 Claims, 9 Drawing Sheets

U.S. PATENT DOCUMENTS

| | | | |
|---|---|---|---|
| 7,190,956 B2* | 3/2007 | Dorenbosch et al. | 709/205 |
| 7,216,167 B2* | 5/2007 | Hamilton et al. | 709/224 |
| 2003/0078979 A1* | 4/2003 | Sagi | 709/206 |
| 2003/0217099 A1* | 11/2003 | Bobde et al. | 709/202 |
| 2003/0217142 A1* | 11/2003 | Bobde et al. | 709/224 |
| 2004/0010808 A1* | 1/2004 | deCarmo | 725/139 |
| 2004/0064512 A1* | 4/2004 | Arora et al. | 709/206 |
| 2005/0044159 A1* | 2/2005 | Niemi et al. | 709/207 |

OTHER PUBLICATIONS

ETSI, "Digital Cellular Telecommunications System (Phase 2+)"; GSM 02.60 version 6.1.1 Release 1997 (31 pages).

Mobile SMS Developers Zone; "The ETSI Standards for SMS"; Dec. 6, 2002 (12 pages).

Yes2Wap website, "WAP Developer's Zone"; Dec. 6, 2002 (15 pages).

* cited by examiner

METHOD AND APPARATUS FOR DISTRIBUTING NOTIFICATION AMONG COOPERATING DEVICES AND DEVICE CHANNELS

FIELD OF THE INVENTION

This present invention relates generally to network connectivity, and more particularly to devices that cooperate in a multiple-network-path service, and methods for such cooperation.

BACKGROUND

Many existing and emerging network services require that a served device maintain a consistently available network connection. For instance, Instant Messaging (IM) services such as Yahoo! Messenger, Jabber™, AOL® Instant Messaging$^{SM}$ (AIM®), and Microsoft Network (MSN®) Messenger allow a user to maintain a list of "buddies" that she can send messages to, and receive messages from, through an IM server. The user connects to the IM server by logging on through a network connection. The IM server allows the user to advertise her "presence" on the network to all or some buddies, determine the presence status of the buddies on a buddy list, and exchange messages quickly with those buddies.

Traditionally, an IM users establishes her presence from a computer with an Internet Protocol (IP) address, running IM software. The IM server notes the IP address of the computer from which presence was established, and sends IM messages directed to that subscriber to the noted IP address. This allows a subscriber to access one IM account either from, e.g., her network-connected work computer, home computer, portable computer, or PDA (Personal Digital Assistant).

Some IM services also now allow users to establish a presence at a cellular telephone that supports SMS (Short Message Service, see ETSI TS 100 901, Version 7.5.0 Release 1998, *Digital cellular telecommunications system (Phase 2+); Technical realization of the Short Message Service (SMS) Point-to-Point (PP)*) or WAP (Wireless Access Protocol). The cellular telephone service provider coordinates the service with the IM service provider, and provides a packet link between its network and the IM service provider. When a cellular subscriber desires to advertise an IM presence, she uses IM menu commands on the cellular telephone to contact the IM service provider, using her cellular telephone number, instead of an IP address, as a location identifier. The IM server treats a login through the cellular telephone much like a standard login from an IP address, except some IM features are handled differently and/or may not be active. The cellular telephone network provider receives IM messages or presence updates for the telephone number, translates those messages or updates into, e.g., one or more SMS messages to the appropriate cellular telephone number, and sends the SMS message(s) to the subscriber's cellular telephone.

BRIEF DESCRIPTION OF THE DRAWING

The embodiments may be best understood by reading the disclosure with reference to the drawing, wherein.

DETAILED DESCRIPTION OF THE EMBODIMENTS

Figure 1:
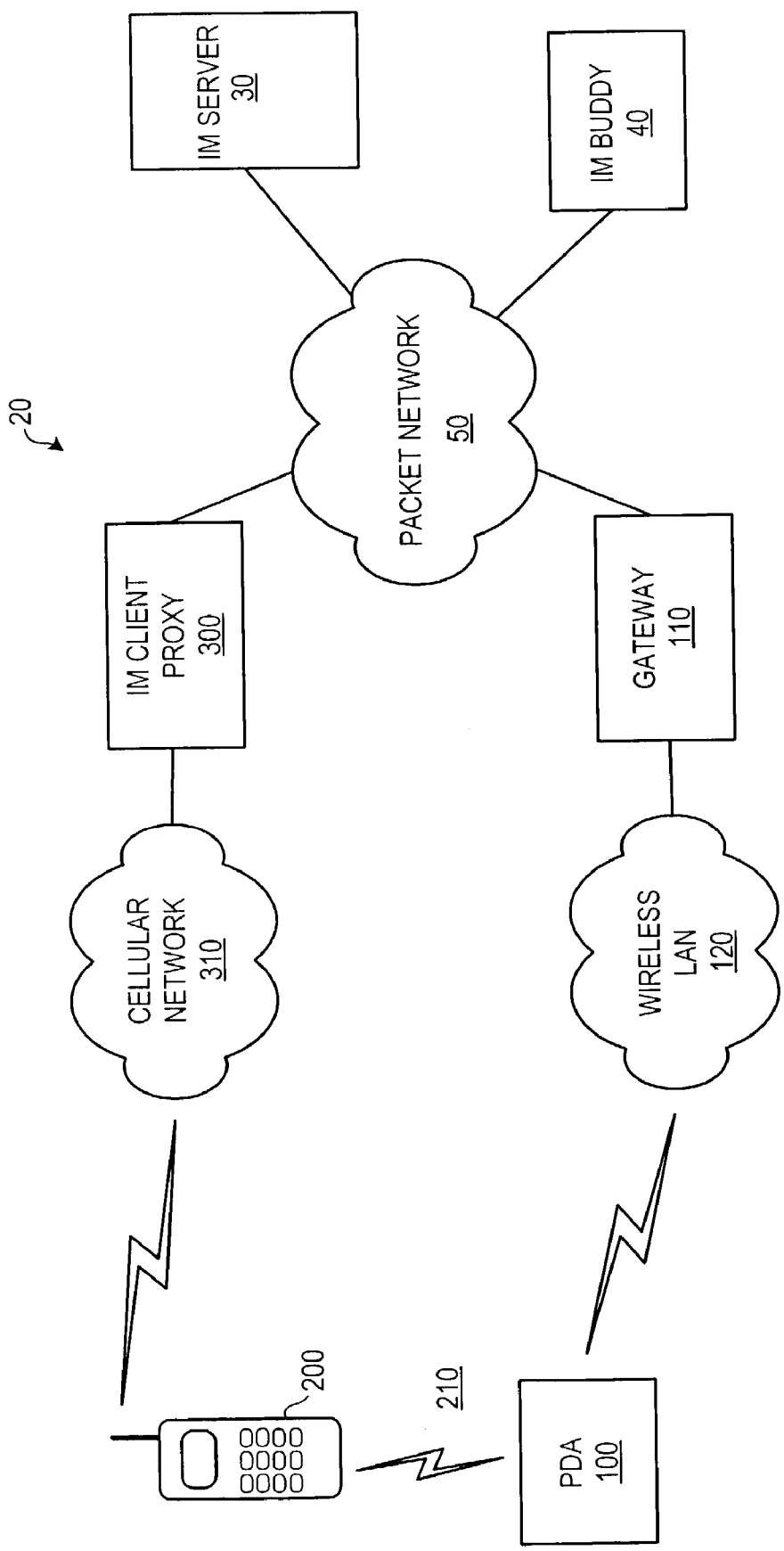
FIG. 1 illustrates an overall system architecture according to an embodiment of the invention.

One disadvantage that accompanies the use of a service that requires a consistently available network connection is that the service will not operate properly without the network connection, even if the network connection is used only infrequently. This disadvantage is particularly troublesome with some battery-powered devices such as laptop computers and PDAs that use wireless connectivity. For instance, an IEEE 802.11b-compliant wireless device can provide a consistently available network connection for a laptop computer or a PDA, but at the cost of a significant persistent power drain that can drastically reduce battery life.

In one set of embodiments, the present invention saves battery power by providing a low-power but consistently available notification network connection to a service through, e.g., a cellular network, and a higher-power/speed primary network connection that can be turned off when not needed. In some embodiments, the two network connections are on different communicating devices, such as a cellular telephone and a PDA, with the PDA running, e.g., an IM application. In other embodiments, the two connections are integrated into, or provided as add-on components to, a single device such as a PDA or laptop.

Although the first set of embodiments emphasize battery power conservation, the invention is also useful in general for devices that presently maintain a network connection just in case a remote peer attempts to reach that device. For instance, a computing device can be designed with a wired or wireless connection that can be put to sleep, and a separate notification channel that is used to wake up the connection when a peer attempts to send a communication through the first channel. The device user can benefit from this arrangement, e.g., by decreasing her connection costs on a primary channel where costs accrue for the privilege of connection to the network. The network provider can benefit as well, as releasing the primary channel may free up capacity to serve other customers.

Each device embodiment requires the outside participation of at least one other networked device, e.g., a proxy, firewall, etc. This networked device can be configured to detect and/or receive traffic bound for the sleeping device, and notify the sleeping device through the notification channel. This networked device may optionally: hold traffic for the sleeping device, for retrieval upon request; delay the traffic for a determined time period to allow the sleeping device to wake up; route the traffic through the notification channel; or throw the traffic away in the expectation that the sender will retry the transmission.

At various places within this document, functionality associated with an embodiment is described as "Universal Reachability" or "UR". Such references refer generally to a capability that allows a device to be disconnected from a first network, and yet still remain reachable through a second network that notifies the device of a transmission that would normally pass to the device across the first network.

With this introduction, several exemplary embodiments will now be described. Referring first to FIG. 1, a system architecture 20 for one embodiment is shown. An IM server 30 allows a subscriber to instant message with an IM buddy 40 over packet (e.g., IP) network 50. In this example, the subscriber runs IM software on PDA 100, connected to packet network 50 through a gateway 110 and a wireless LAN 120. The subscriber also has available a cellular telephone 200, connected to a cellular network 310. Cellular telephone 200 has the capability to communicate with an IM client proxy 300 that connects to cellular network 310 and to packet network 50.

In prior art IM systems, the subscriber possessing telephone 200 and PDA 100 has two choices for instant messaging. She can login from PDA 100, through wireless LAN 120 and gateway 110. Or she can login from cellular telephone 200, through cellular network 310 (IM client proxy 300 is not needed). The first choice allows for a full-function, relatively easy-to-use IM endpoint—but requires that the subscriber leave the PDA and its wireless transceiver on to receive IM messages when the subscriber is advertised as available. The second choice uses a device that has a much longer battery life—usually days—but a generally limited display and awkward user interface for instant messaging.

In this described embodiment, one or perhaps two other instant messaging choices are available. PDA 100 and cellular telephone 200 communicate over a wireless link 210, which can be a Bluetooth™ channel, an IR link, etc. The subscriber links the devices, and activates (either from the telephone or from the PDA) software to route IM notification through cellular telephone 200 (the details of this exchange will be explained shortly). PDA 100 can then enter a low-power sleep mode until awakened by the user or by a signal from telephone 200. Meanwhile, any messages directed to the subscriber from IM server 30 will go to IM client proxy 300, prompting a notification to cellular telephone 200. In one possible mode, the cellular telephone merely wakes up PDA 100, which then uses its wireless LAN connection to retrieve IM messages from IM client proxy 300 (or possibly directly from IM server 30). In another possible mode, useful, e.g., when wireless LAN 120 is unavailable, IM messages are retrieved directly through cellular telephone 200.

Figure 2:
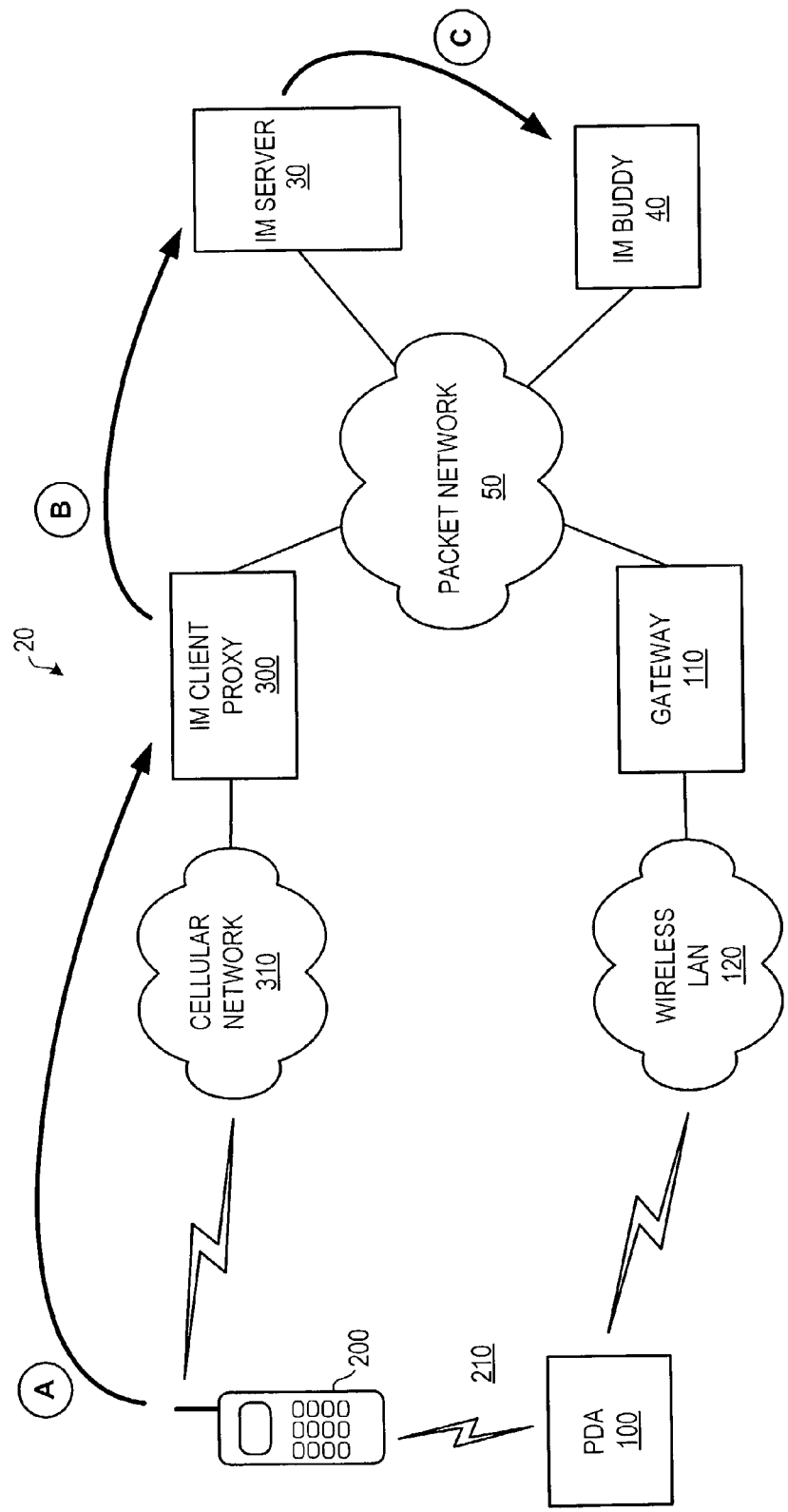
FIG. 2 illustrates an IM profile initiation process with the architecture shown in FIG. 1.

FIG. 2 illustrates one method for updating a subscriber's IM presence according to an embodiment. A presence profile request message A is sent from cellular telephone 200 to IM client proxy 300, e.g., using WAP or SMS. Unlike a prior art standard cellular telephone IM connection, however, message A does not request that a wireless IM session be initiated. Instead, message A requests that client proxy 300 initiate what appears to be a standard IM session with IM server 30, using a presence profile supplied from cellular telephone 200.

Upon receiving presence profile request message A, IM client proxy 300 sends an IM presence update B to IM server 30. Presence update B can, e.g., log on to the subscriber's IM account and set a presence status ("I'm Available"). To the IM server, it appears that the subscriber's IP address is the IP address of IM client proxy 300.

IM server 30 serves the subscriber as it would were the subscriber logged on directly. For instance, after receiving presence update B, IM server 30 sends a presence notification C to the subscriber's IM buddy 40, informing the buddy that the subscriber is available.

After the subscriber's presence has been propagated to her online buddies, the system components wait for further IM transactions to occur. IM client proxy 300 remains ready to receive messages for the subscriber from IM server 30. Cellular telephone 200 remains on, in contact with cellular network 310 so that it is reachable from IM client proxy 300, and within Bluetooth contact range of PDA 100; PDA 100 can be either active or in a sleep mode awaiting a Bluetooth wake-up command.

Figure 3:
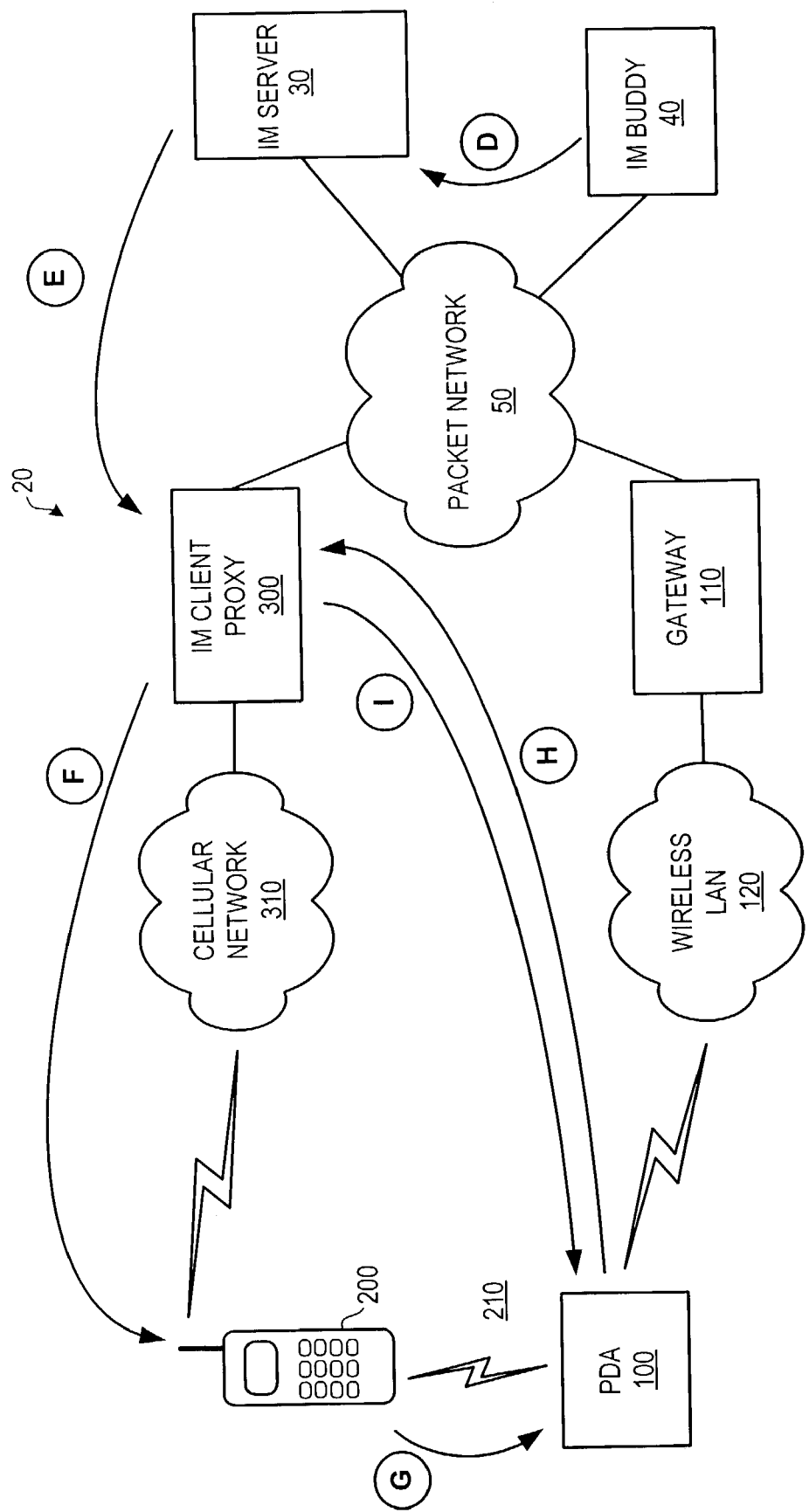
FIG. 3 illustrates an IM message notification and delivery process with the architecture shown in FIG. 1.

FIG. 3 illustrates one method for processing a message issued by IM buddy 40 to the subscriber. IM buddy 40 sends a message D, addressed to the subscriber, to IM server 30. IM server 30 determines from its internal database that the subscriber can be reached at the IP address supplied by IM client proxy 300, and forwards incoming message D as outgoing message E. IM client proxy 300 receives message E and stores it. IM client proxy 300 determines from its internal database the cellular address for the subscriber, and generates a message notification F to cellular telephone 200. Message notification F can be just a wakeup request, or can contain further detail, including, e.g., identification of the IM buddy who sent a message, the size of the message, or possibly even contain the message itself (or part of the message).

Upon receiving message notification F, cellular telephone 200 attempts to wake up PDA 100 and relay a message notification G to the PDA. Once the PDA is awakened, message notification G is delivered to the IM application running on PDA 100. The IM application determines whether notification G contains the entire message D sent by the IM buddy. If message D is complete, PDA 100 displays the message to the subscriber. Otherwise, PDA 100 issues a request H to IM client proxy 300, requesting the content of message D from the proxy. IM client proxy 300 responds to request H by retrieving the stored message E and delivering the content of that message as a message download I.

It is possible that, upon receiving notification G, a LAN connection is unavailable to PDA 100. In some embodiments, PDA 100 can rely on its connection to cellular telephone 200, and the cellular telephone's access channel to 1N proxy server 300, to request and receive message download I.

Other IM transactions are also possible with the described system. For instance, IM server 30 may, from time to time as the status of the subscriber's buddies changes, send updates to IM client proxy 300. IM client proxy 300 can forward these updates to cellular telephone 200. The cellular telephone can be configured to relay such updates immediately to the PDA. In the alternative, to avoid waking the PDA unnecessarily, the cellular telephone can be configured to queue such updates until either a substantial number are received, until a message from a buddy is received, or perhaps until a specific buddy becomes available. It is even possible to configure the cellular telephone to coalesce multiple status updates, related to a given buddy, while those updates are queued. For instance, if several received status updates identify Buddy1 as "available", then "unavailable", then "available", then "busy", the queue could save only the latest status update, e.g., "busy" for Buddy1.

The subscriber may also send messages, status updates (e.g., "I'm Invisible"), etc., from either cellular telephone 200 and/or PDA 100 through proxy 300. Status messages can also be intended only for proxy 300. For instance, the subscriber may wish to avoid cellular network charges except when the PDA is asleep. Thus, upon waking, PDA 100 instructs IM client proxy 300 to communicate using path I until further instructed. Before going to sleep, or if a network disconnect is detected, PDA 100 can instruct IM client proxy 300 to resume communicate with it via cellular telephone 200.

Figure 4:
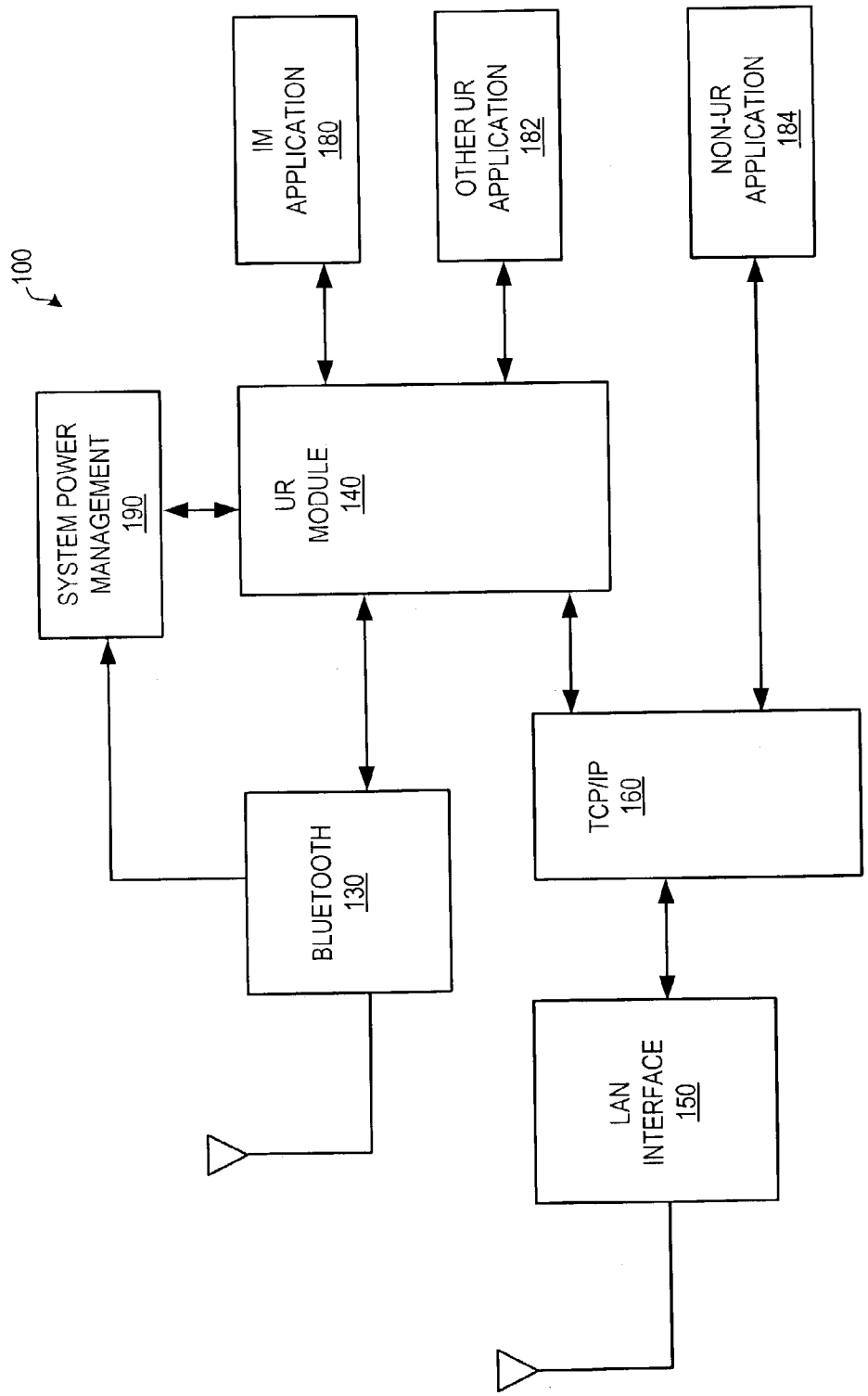
FIG. 4 is a partial block diagram for a PDA or other computing device capable of use in the architecture shown in FIG. 1.

FIG. 4 shows a partial block diagram of PDA 100. FIG. 4 is not a hardware diagram, as the partitioning of functions among processors, circuits, memory devices, add-in or plug-in functions, etc. will vary from device to device. It is understood that, in general, this block diagram is illustrative of many other computing devices that incorporate an embodiment of the invention as well.

PDA 100 has two network interfaces, a Bluetooth interface 130 and a LAN interface 150. Functionally, the Bluetooth interface serves as a notification port (although it may serve other functions as well), and perhaps as an IM messaging port in some modes. Bluetooth interface 130 has the capability to signal system power management 190 when a "wake-up" command is received. LAN interface 150 serves as a primary packet interface, e.g., to a wireless network as shown (an IEEE 802.11b network, for example) or to a wired network, such as an Ethernet-variant LAN. A TCP/IP function 160 provides network and delivery services for traffic passing through the LAN interface. TCP/IP can optionally pass traffic through Bluetooth interface 130 as well, but such a connection is not illustrated.

PDA 100 can typically launch many different applications, but three communication applications are shown in FIG. 4. An instant messaging application 180, and one other Universal Reachability (UR) application 182, communicate with UR module 140. A non-UR application 184 exists as well, and communicates directly with TCP/IP function 160.

UR module 140 is at the heart of the Universal Reachability subsystem. UR module 140 can communicate with both Bluetooth interface 130 and LAN interface 150, can service requests, and can deliver information or instructions to applications 180 and 182. Further, in some embodiments UR module 140 communicates with system power management 190. The functions served by UR module 140, for each of its connections, will now be explained.

To utilize the UR feature, the Bluetooth interface is first peered with another Bluetooth device (not shown), such as cellular telephone 200, that delivers notification messages to PDA 100. This peering process may be initiated by the UR module automatically when a user launches a UR-enabled application, in response to a user request, or by the remote Bluetooth device. Generally, however, a user must set a permission to allow peering to occur, and peering will search for and/or allow only a permitted UR-notification Bluetooth device. After the Bluetooth devices are peered, and any proxy communications assigned to PDA 100 are performed, PDA 100 may be put to sleep.

Subsequently, UR module 140 receives IM notification messages (and/or notification messages for application 182) from Bluetooth interface 130 (it is assumed that if the device was in sleep mode, Bluetooth interface 130 has already "woken up" the device by this time). The Bluetooth interface 130 is supplied with a UR profile, such that when a packet recognizable as a UR packet is received, interface 130 passes that packet up to UR module 140. UR module 140 parses the packet, decides which registered UR-capable application the packet pertains to, and then takes further action. Taking IM application 180 and the receipt of a "new message from buddy N" notification as an example, several possible "further actions" are possible. If the new message is appended to the notification, UR module 140 can pass the message to IM application 180. If the new message must be retrieved from the proxy, UR module 140 can retrieve the message from the proxy, using LAN interface 150 if available, or if not, possibly using Bluetooth interface 130. Alternately, if IM application 180 has sufficient capability, the notification can be passed to application 180, which is then responsible for initiating message retrieval from the proxy.

In addition to retrieving messages using LAN interface 150, UR module 140 can perform other functions over the primary network. Whenever LAN interface 150 is connected, presence updates and other proxy requests can proceed over the LAN interface. In some embodiments, UR module 140 has a configurable capability to select either the Bluetooth interface 130 or the LAN interface 150 for proxy traffic.

UR module 140 communicates with IM application 180 and UR-enabled application 182 to effect message delivery. In different embodiments, the UR-enabled application may or may not be UR-aware. For instance, a UR-aware application may have a user configuration interface for entering and activating UR settings. Such an application can receive notification messages directly, and knows how to reach a proxy to retrieve information stored on the application's behalf. In contrast, a UR-unaware application may perceive UR module 140 as a standard TCP/IP interface. When used with a UR-unaware application, UR module 140 processes all UR notification messages and retrieves IM traffic from the proxy for the application.

Finally, UR module 140 can interface with system power management (SPM) 190. One use of such an interface is to allow SPM 190 to respond to requests from UR module 140 to enter sleep mode. Another use is to allow SPM 190 to notify UR module 140 of an impending sleep session, or to notify UR module 140 that the device has been awakened. UR module 140 can use an early power status change notification to issue appropriate messages to a Bluetooth notification device and/or a proxy, informing those devices of the device status change.

Figure 5:
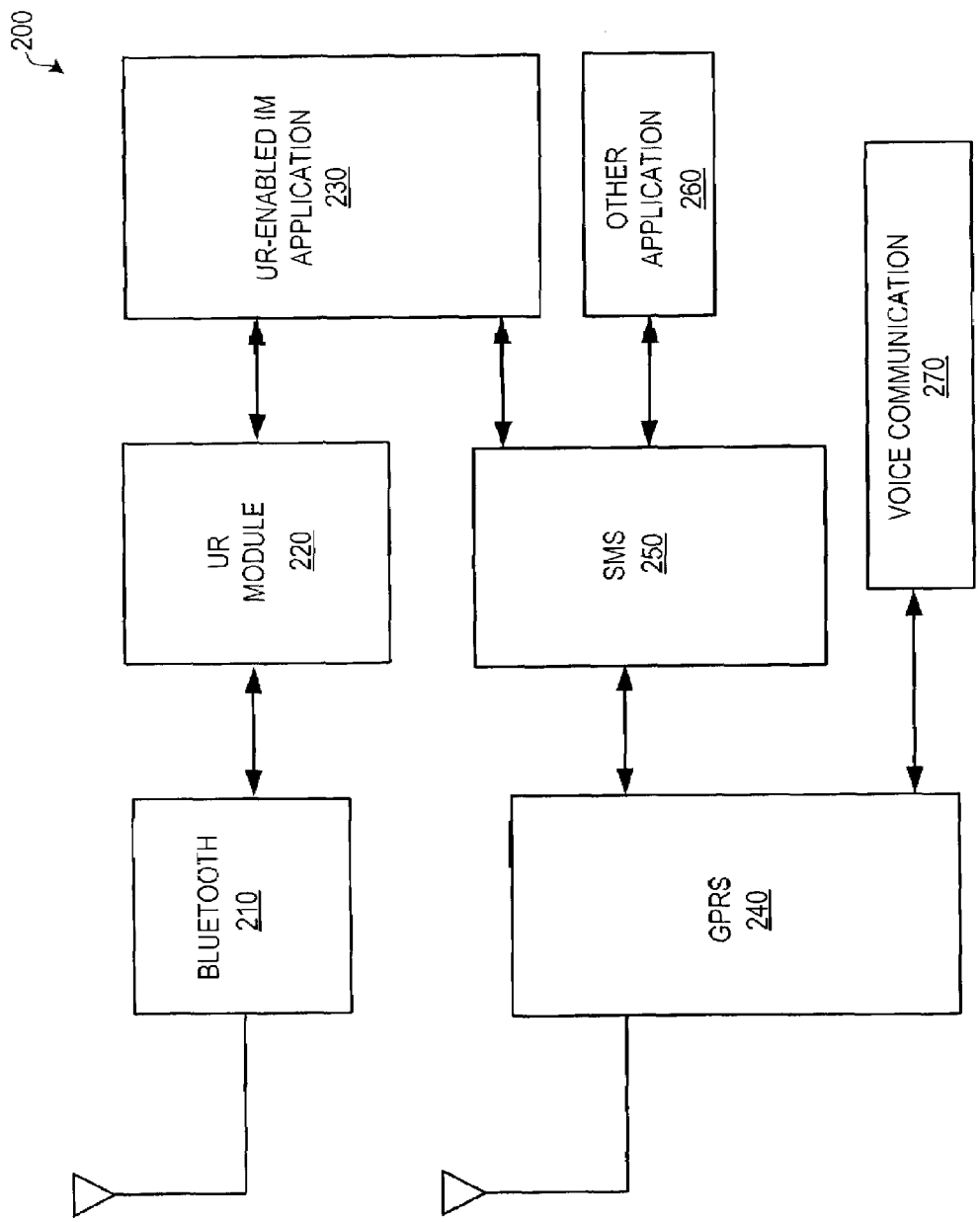
FIG. 5 is a partial block diagram for a cellular telephone or other mobile communication device capable of use in the architecture shown in FIG. 1.

FIG. 5 shows a partial block diagram of cellular telephone 200. FIG. 4 is not a hardware diagram, as the partitioning of functions among processors, circuits, memory devices, add-in or plug-in functions, etc. will vary from device to device. It is understood that, in general, this block diagram is illustrative of many other devices, including a built-in GPRS (General Packet Radio Service, see ETSI EN 301 113 Version 6.1.1 (1998-11), *Digital cellular telecommunications system (Phase 2+); General Packet Radio Service (GPRS); Service description; Stage* 1) function or add-on GPRS module for device 100. When device 200 is connected directly to device 100, the Bluetooth transceivers are unnecessary, and can be replaced by inter-process communication software and/or bussed communications.

Cellular telephone 200 has two radio-frequency (RF) transceivers, a Bluetooth transceiver 210 and a GPRS transceiver 240. Those skilled in the art will recognize that these RF transceivers are merely exemplary, and that competing systems (e.g., IR line-of-sight and other RF short-range packet networks instead of Bluetooth, and Cellular Digital Packet Data (CDPD) networks instead of GPRS) can also be used with the invention. The Bluetooth (or suitable replacement) transceiver 210 communicates with PDA 100, as previously described. The GPRS (or suitable replacement) transceiver 240 communicates with a cellular network (e.g., FIG. 1 network 310). GPRS transceiver 240 can also function as a GSM transceiver for voice communication function 270.

As shown, a Short Message Service (SMS) module 250 resides between GPRS transceiver 240 and a UR-enabled IM application 230. SMS allows many types of messages to pass across the cellular network, including downloadable ringtones, screen savers (destined, e.g., for "other application" 260), and standard cell-to-cell or IM cellular text messages. In the present embodiment, a new SMS message type, for instance an "IM Notify Channel" message type, is defined. SMS module 250 is configured to pass such messages to UR-enabled IM application 230. SMS module 250 can also receive IM Notify Channel messages from IM application 230, for forwarding to an IM client proxy using the GPRS transceiver. It is noted that SMS, while useful, is not the only method of transferring IM Notify Channel messages. The IM client proxy can use packets formatted according to the Wireless Application Protocol (WAP) to push notification data to cellular telephone 200. A completely new cellular-wireless-layered protocol could be employed as well.

The UR-enabled IM application can take many forms. One form can be a rudimentary interface that does nothing more than allow a subscriber to select a Bluetooth peer, enable the UR module, and pass messages. Potentially, the IM application can alternately store non-urgent notifications, such as changes in IM buddy presence status, until a better reason exists (e.g., an IM message arrives, or the notification buffer is full) to wake up the PDA. The IM application can also include a full text-mode mobile IM function that can operate instead of, or in parallel with, the Bluetooth-connected IM device.

UR module 220 serves as an interface between IM application 230 and Bluetooth transceiver 210. The UR module contains Bluetooth profiles for UR communications. The UR module can also establish and maintain UR connectivity with PDA 100, including issuing wake-up messages and tracking whether the PDA is awake or asleep.

Figure 6:
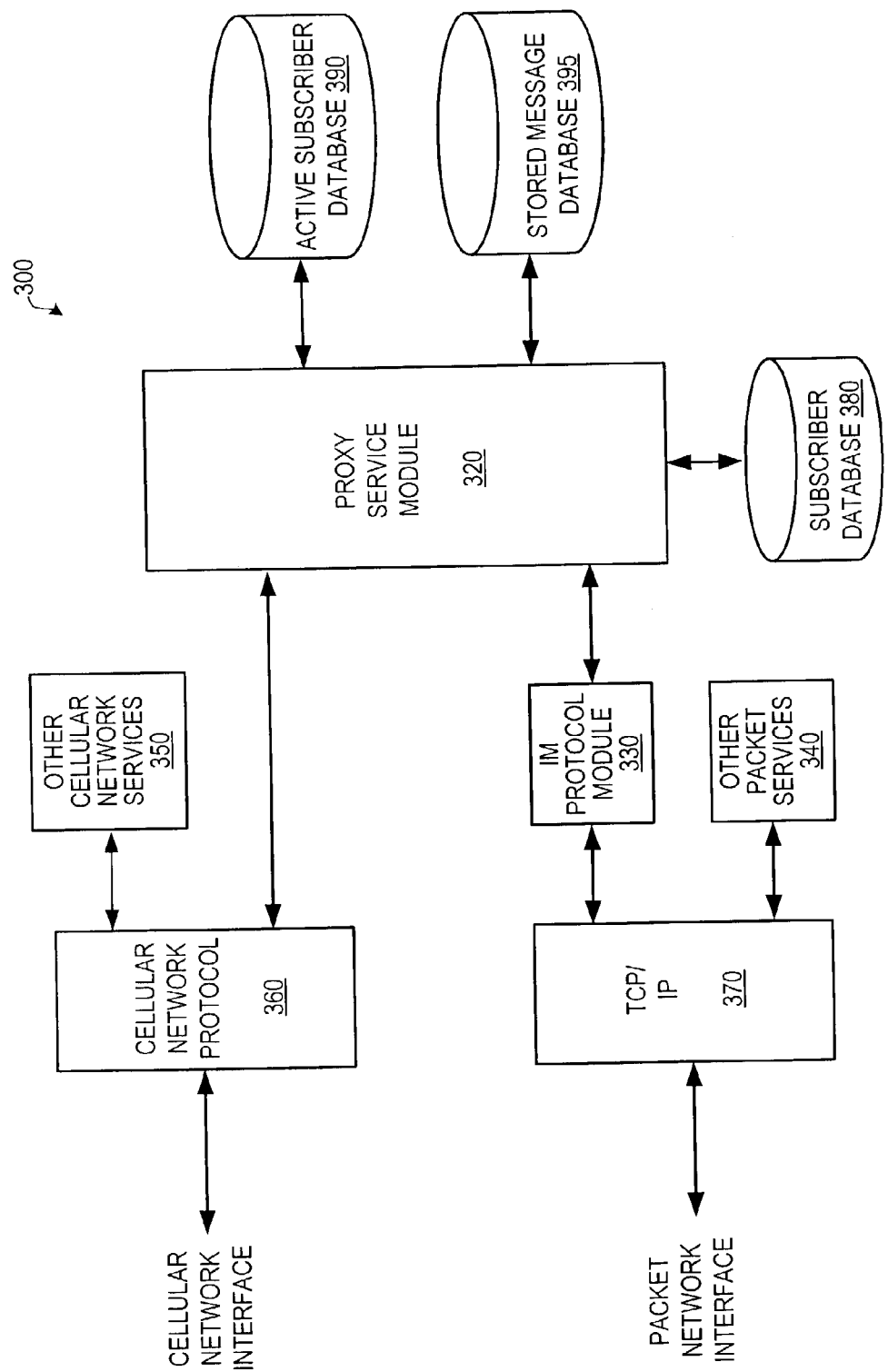
FIG. 6 is a partial block diagram for an IM proxy server capable of use in the architecture shown in FIG. 1.

FIG. 6 contains a partial functional block diagram for an IM proxy server 300 according to an embodiment of the present invention. IIM proxy server 300 can be implemented, e.g., using one or more programmable network servers, with local or remote storage for the indicated databases. IM proxy server 300 may, of course, serve functions other than acting as an IM proxy (see blocks in FIG. 6 for other packet services 340 and other cellular network services 350).

Proxy server 300 maintains an interface to packet network 50 (FIG. 1). In FIG. 6, a TCP/IP interface 370 is shown, although alternate interfaces may exist and/or be used to support an embodiment of the invention as well. An IM protocol module 330 sits above TCP/IP interface 370, and processes inbound and outbound IM packets. For communication with an IM server, IM protocol module 330 can emulate a standard IM application. Optionally, the IM server can have some understanding of the proxy's presence, such that communication between the two is streamlined. IM protocol module 330 can also communicate with the UR module 140 in PDA 100, e.g., to process message download requests, initiate subscriber status changes, etc.

Proxy service module 320 performs management duties for the proxied message streams. For instance, a subscriber database 380 is maintained, indicating who is authorized to use the proxy service, the cellular phone number and IM account information for each subscriber, and any other stored information that can be pre-configured for a given user (the database can also track proxy service usage by subscriber, e.g., for billing purposes). When a subscriber utilizes the system to proxy an IM session, proxy service module 320 creates an entry for that subscriber in active subscriber database 390. The entry is referenced to initiate the IM session, route messages and notifications, and track subscriber status. Proxy service module 320 also maintains a stored message database 395. Database 395 caches messages for sleeping subscribers, for subsequent delivery (or in some cases deletion if reliable delivery is not guaranteed and the messages age).

When a message, buddy presence update, etc., is received by proxy service module 320, the module matches the message or update with an entry in active subscriber database 390. If the subscriber device is not sleeping (or if the proxy is unsure), it can attempt to forward the message to the subscriber using IM protocol module 330 and TCP/IP interface 370. If this is unsuccessful or unattempted, the message or update can be placed in stored message database 395, or possibly forwarded in whole to the cellular network interface, depending on configuration and setting. In either event, proxy service module 320 creates a notification message to the registered cellular number, and forwards the notification message through cellular network protocol 360 and out the cellular network interface. Proxy service module 320 can also receive messages from a subscriber over the cellular network interface and process those messages, as has been previously described.

The configuration shown in FIG. 1, where IM client proxy 300 bridges between packet network 50 and cellular network 310, is only one of many possible configurations. For instance, the packet network interface and cellular network interface in FIG. 6 could both be served by a common packet network interface, e.g., with cellular network protocol 360 using an IP network interface to send cellular network packets to a separate packet network/cellular network bridge. With such an arrangement, IM client proxy 300 could be located just about anywhere, including on IM server 30, on or behind gateway 110, or at some other location with a connection to packet network 50.

Figure 7:
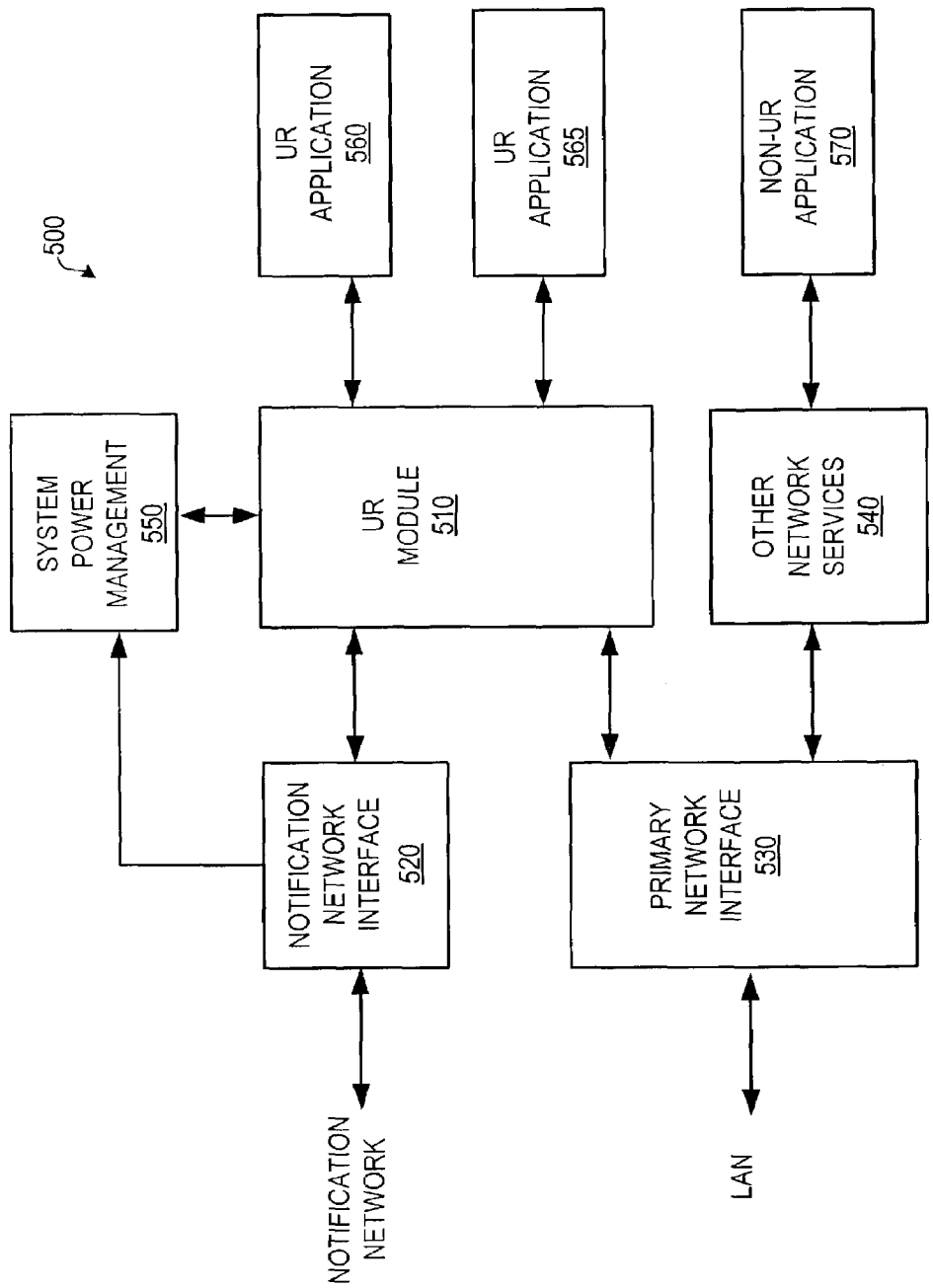
FIG. 7 is a partial block diagram for a generalized computing device capable of operating in a distributed notification system.
Figure 8:
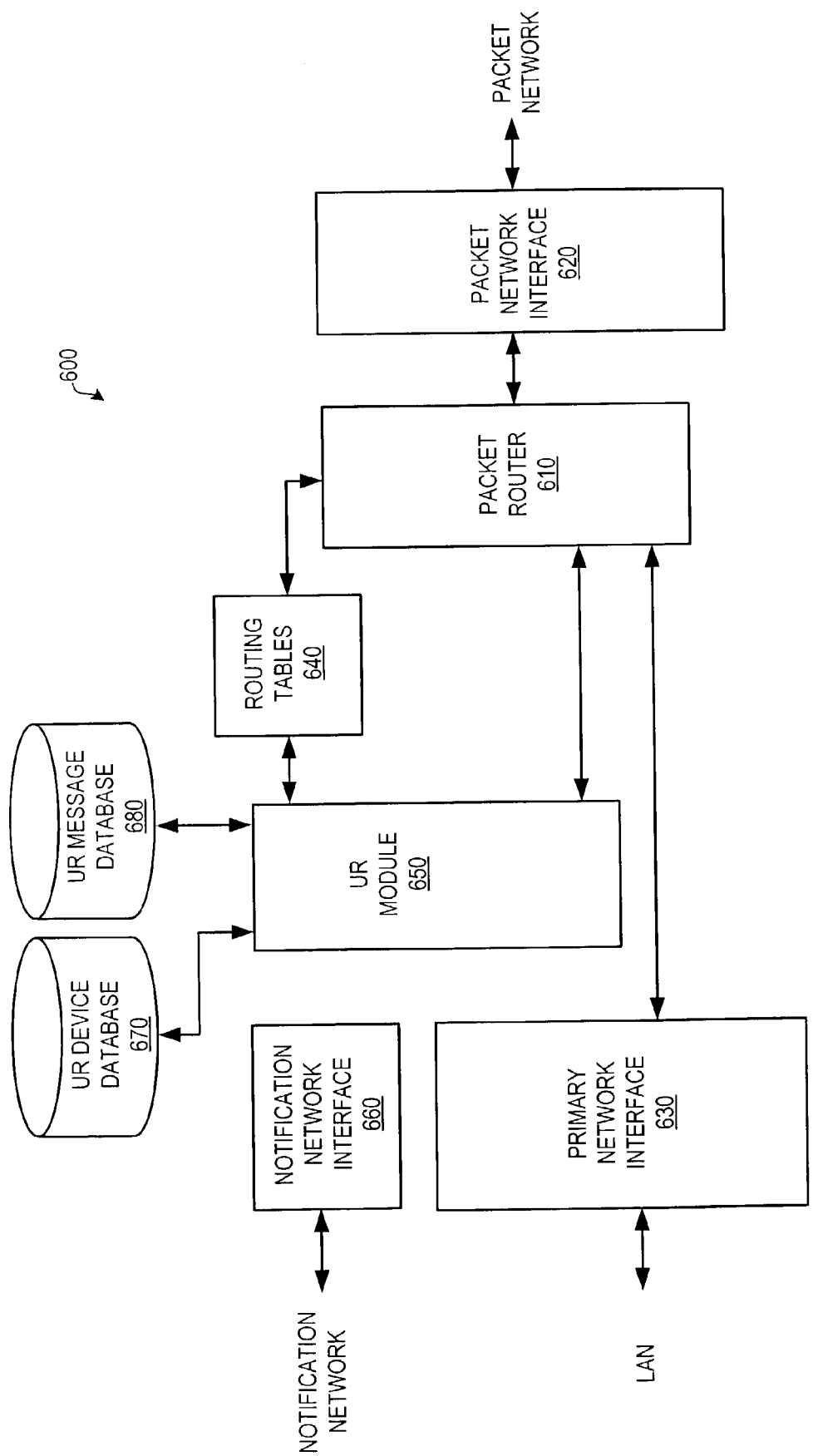
FIG. 8 is a partial block diagram for a local area network gateway capable of implementing a distributed notification system.
Figure 9:
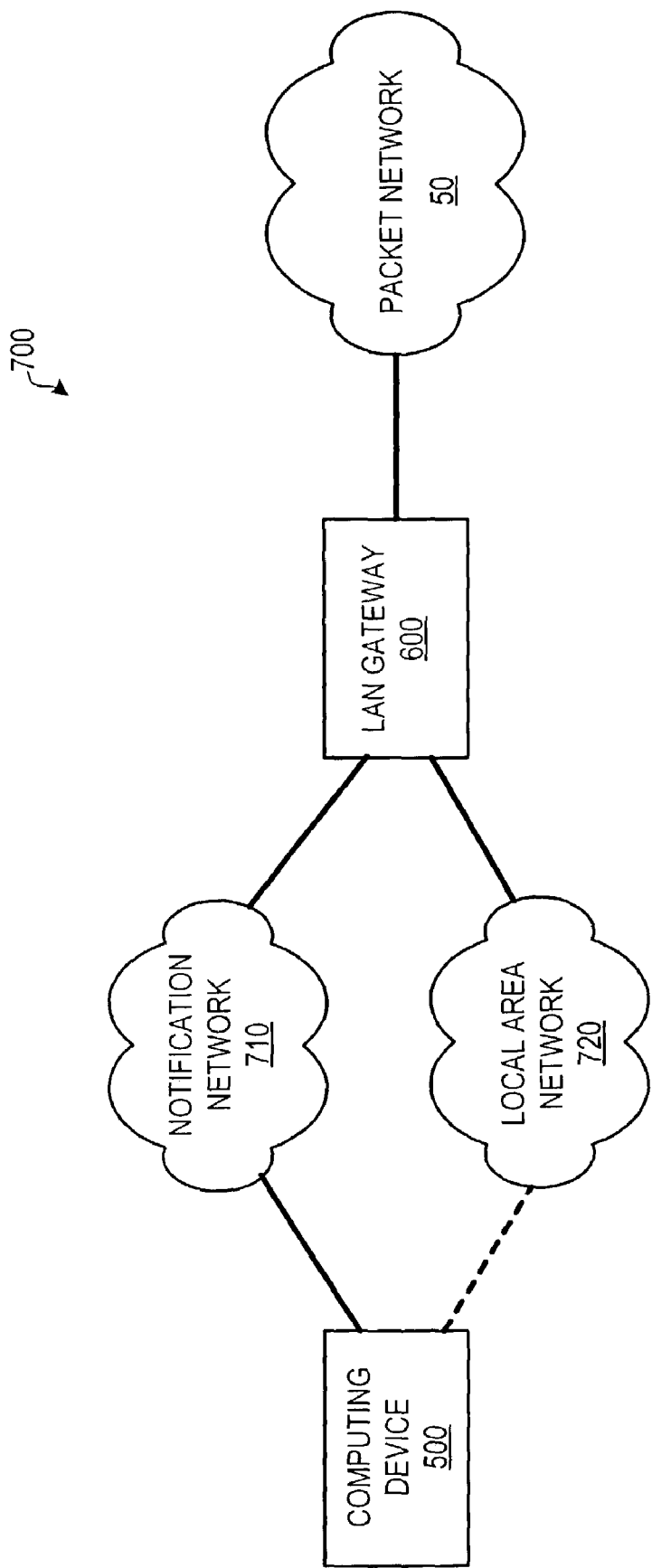
FIG. 9 illustrates a distributed notification system including the computing device of FIG. 7 and the network gateway of FIG. 8.

An alternate configuration is illustrated by the embodiments shown in FIGS. 7-9, which illustrate how the invention can be utilized for other services and networks. FIG. 7 illustrates functional blocks for a UR-enabled computing device 500. A UR module 510 communicates with a notification network interface 520 and a primary network interface 530. The primary network interface is normally used for all networked communications. But the primary network interface (and much of the device) can be put in a sleep mode. In sleep mode, a "wakeup" command can be issued on the notification network to awaken the device, (usually waking the primary network connection as well). The wakeup command is received by notification network interface 520, which responds by signaling system power management 550 to awaken the device. A notification message is parsed by UR module 510 to determine which UR application, 560 or 565, is to be notified to contact a remote proxy. Alternately, UR module 510 can contact the proxy to initiate the transfer (in which case the transferred data need not even pass through the UR module).

FIG. 8 illustrates a LAN gateway 600 capable of interacting with computing device 500. Like computing device 500, LAN gateway 600 has a notification network interface (660) and a primary network interface (630). LAN gateway 600 also has a packet network interface 620 to communicate with a larger network.

LAN gateway 600 includes at least a simple packet router 610 with ports to packet network interface 620, primary network interface 630, and UR module 650. Packet router 610 uses routing tables 640 to route packets from the packet network to either primary network interface 630 or UR module 650. Normally, packets directed to LAN gateway 600 are routed through primary network interface 630. But a UR device normally located on the LAN can request that its traffic be routed instead to UR module 650. When a UR device makes such a request, its entry in routing tables 640 is modified (e.g., flagged) to redirect its incoming packets to UR module 650.

UR module 650 maintains a UR device database 670 and a UR message database 680. The UR device database 670 contains information on UR devices that are currently using UR profiles. When a packet is received for a UR device that is listed as sleeping, UR module 650 directs that packet to UR message database 680. A wake-up/notification message is generated and sent to the UR device through the notification network interface 660. Once the UR device awakens, it queries LAN gateway 600 in order to receive the packet(s) stored in UR message database 680.

FIG. 9 shows a system architecture 700 that includes computing device 500 and LAN gateway 600. Both device 500 and gateway 600 connect to LAN 720 and notification network 710. Computing device 500 can use either network connection to request that the LAN gateway serve as proxy for traffic normally directed to device 500 over LAN 720. Computing device 500 can then disconnect itself from LAN 720 until it receives a notification message over notification network 710. The notification network generally remains connected to both devices, although it may be disconnected from computing device 500 when the device is currently connected through LAN 720. Depending on the area covered, the notification network could be, e.g., a series of connected Bluetooth piconetworks, or an IEEE 802.11b-compliant network.

In addition to the previously described IM application, this embodiment can serve just about any application where a device has an application that expects packet traffic to be directed to it, but such traffic is expected to be infrequent and/or sporadic, and the device does not know when such traffic will arrive. For instance, computing device 500 can remain asleep, or at least turn off its LAN interface, until notified that: an IM message has arrived for the device; e-mail has arrived for the device; requested alerts, such as stock alerts, have arrived from a remote alert service; or a remote node is requesting a web service, where computing device 500 provides the web service.

Many variations on the above embodiments will become apparent to those skilled in the art upon reading this disclosure. For instance, a UR proxy (and/or a mobile communication device) can assume that a UR device has gone back to sleep if an "I'm awake" message is not received after some interval since the last communication between the two. If a UR device becomes unreachable over either network, it can be automatically removed from the proxy server's active device listing. The UR module in a sleepable device can determine when conditions warrant (e.g., notification network connection available, no outgoing LAN traffic) initiating a UR session. Although some parts of the device implementations will certainly exist in hardware, most embodiments will implement many, if not all, of the functions described using software and/or firmware. Power saving is only one possible benefit from use of the invention, and such a benefit need not exist in all implementations. One of ordinary skill in the art will recognize that the concepts taught herein can be tailored to a particular application in many other advantageous ways.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a networked device, the method comprising:
    the networked device receiving a request that the networked device receive data traffic for a proxied device having a primary network interface while the proxied device's primary network interface is temporarily unavailable;
    in response to the request,
        receiving data traffic for the proxied device,
        sending a notification to the proxied device, over a notification channel that does not connect to the proxied device's primary network interface, that data traffic has been received, and
        serving the received data traffic to the proxied device via the primary network interface, when the primary network interface is available.

2. The method of claim 1, wherein serving the received data traffic to the proxied device comprises receiving a request from the proxied device to transfer the received data traffic over the primary network interface, and responding to that request.

3. A computing device comprising:
    a primary packet data interface;
    a secondary data interface configurable as a notification network interface; and
    a function capable of receiving notification, through the notification network interface, that a communication was attempted with the device while the primary packet data interface was unavailable, the function farther capable of responding to the notification by retrieving the communication from a proxy device.

4. The computing device of claim 3, further comprising a power management system capable of sleeping the function and the primary packet data interface, and subsequently waking the function and primary packet data interface upon receipt of a wakeup instruction through the second data interface.

5. The computing device of claim 3, wherein the function has the capability to select whether to retrieve the communication from the proxy device through the primary packet data interface or through the notification network interface.

6. The computing device of claim 3, wherein the secondary data interface comprises a cellular network interface.

7. The computing device of claim 3, wherein the secondary network interface comprises a short-range packet wireless network interface.

8. The computing device of claim 3, wherein the function comprises an instant messaging application with a capability to appear, via use of the proxy device, available for messaging when the application is sleeping.

9. The computing device of claim 3, wherein the function comprises an application selected from the group of applications comprising: instant messaging, remote alert of the occurrence of a requested event, electronic mail, and serving a web service.

10. The computing device of claim 3, wherein the device is a personal digital assistant, the primary packet data interface is a wireless local area network transceiver, and the secondary data interface is a Bluetooth transceiver.

11. A proxy device comprising:
primary packet data interface
a secondary data interface configurable as a notification network interface;
a proxy service module capable of receiving packet data intended for a proxied device, sending notification to the proxied device over the notification channel interface when such packet data is received, and serving the received packet data to the proxied device via the primary packet data interface.

12. The proxy device of claim 11, wherein the primary packet data interface and secondary data interface use a common physical port, but with the secondary data interface directing packet data to a node on the notification network.

13. The proxy device of claim 11, further comprising a storage area organized to cache received packet data intended for the proxied device, and a proxy service module to serve cached data to the proxied device upon request.

14. An article of manufacture comprising computer-readable media containing instructions that, when executed or interpreted by a processor or cooperating processors, cause that processor or processors to perform a method comprising:
a networked device receiving a request that the networked device receive data traffic for a proxied device having a primary network interface while the proxied device's primary network interface is temporarily unavailable;
in response to the request,
receiving data traffic for the proxied device,
sending a notification to the proxied device, over a notification channel that does not connect to the proxied device's primary network interface, that data traffic has been received, and
serving the received data traffic to the proxied device via the primary network interface, when the primary network interface is available.

15. The article of manufacture of claim 14, wherein serving the received data traffic to the proxied device comprises receiving a request from the proxied device to transfer the received data traffic over the primary network interface, and responding to that request.

16. The method of claim 1 wherein the notification channel comprises a lower power, consistently available network connection and the primary network interface comprises a higher power connection.

17. The method of claim 3 wherein the secondary data interface comprises a lower power, consistently available network connection and the primary packet data interface comprises a higher power connection.

18. The method of claim 11 wherein the secondary data interface comprise a lower power, consistently available network connection and the primary packet data interface comprises a higher power connection.

19. The article of manufacture of claim 14, wherein the notification channel comprise a lower power, consistently available network connection and the primary network interface comprises a higher power connection.

* * * * *

UNITED STATES PATENT AND TRADEMARK OFFICE
CERTIFICATE OF CORRECTION

PATENT NO. : 7,269,629 B2 Page 1 of 1
APPLICATION NO. : 10/335100
DATED : September 11, 2007
INVENTOR(S) : Krystof C. Zmudzinski and Rob C. Knauerhase It is certified that error appears in the above-identified patent and that said Letters Patent is hereby corrected as shown below:

Column 10, line 40, the last word "farther" should be replaced with --further--

Column 11, line 6, the line "primary packet data interface" should be replaced with --a primary packet data interface;--

Signed and Sealed this

Twenty-fifth Day of December, 2007

JON W. DUDAS
*Director of the United States Patent and Trademark Office*